Figure 1:
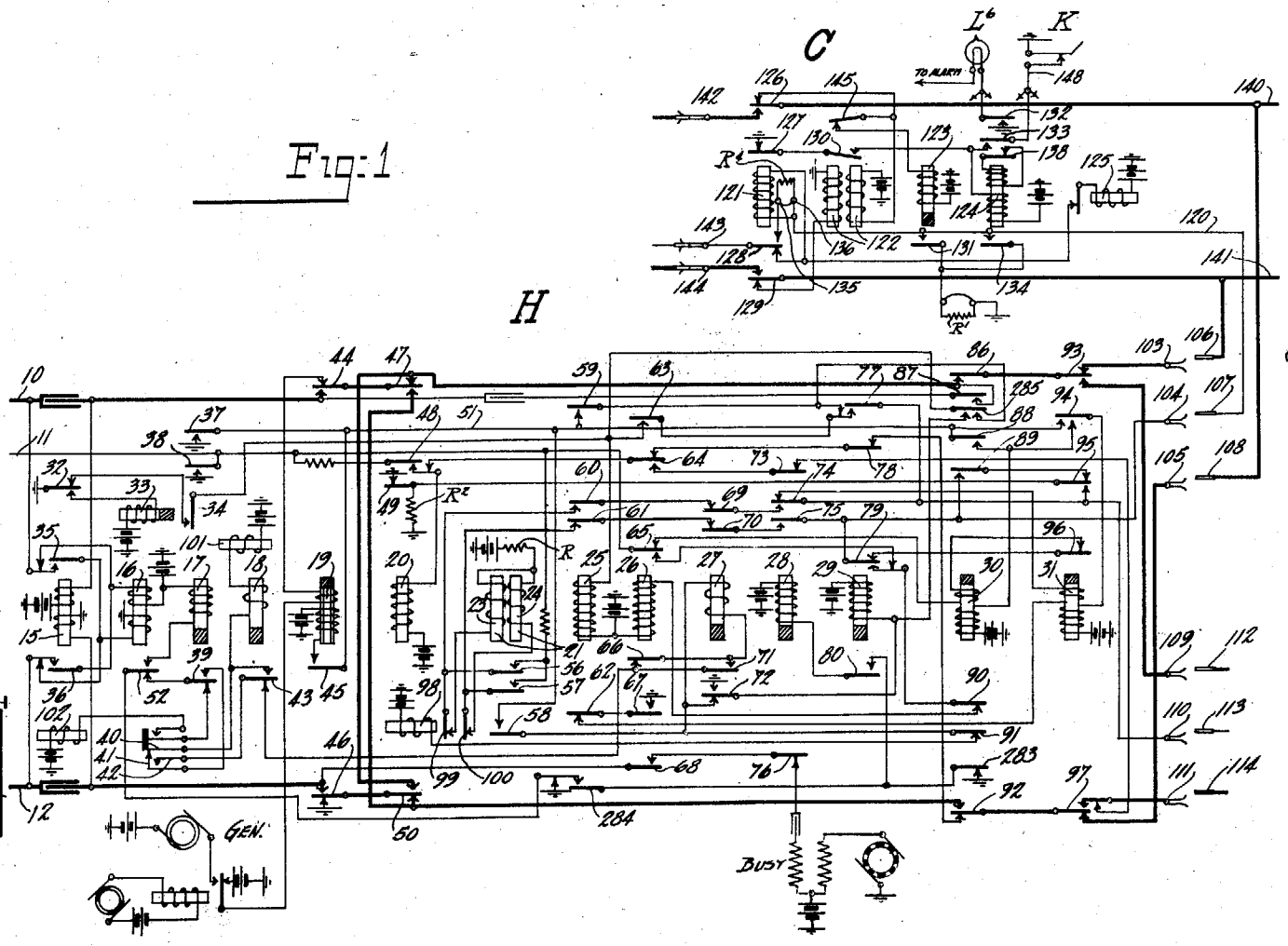

J. E. GARDNER

Dec. 6, 1932. AUTOMATIC TELEPHONE SYSTEM Re. 18,686

Original Filed Jan. 27, 1922 3 Sheets-Sheet 1

Inventor
John E. Gardner
Chas. W. Candy Atty.

Dec. 6, 1932.

J. E. GARDNER

AUTOMATIC TELEPHONE SYSTEM

Re. 18,686

Original Filed Jan. 27, 1922 3 Sheets-Sheet 2

Inventor
John E. Gardner
Chas. Ten. Candy Atty.

J. E. GARDNER

Dec. 6, 1932. AUTOMATIC TELEPHONE SYSTEM Re. 18,686

Original Filed Jan. 27. 1922 3 Sheets-Sheet 3

Inventor
John E. Gardner
Chas. Ed. Candy Atty.

Reissued Dec. 6, 1932

Re. 18,686

UNITED STATES PATENT OFFICE

JOHN E. GARDNER, OF CLARENDON HILLS, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

AUTOMATIC TELEPHONE SYSTEM

Original No. 1,727,592, dated September 10, 1929, Serial No. 532,159, filed January 27, 1922. Renewed December 3, 1928. Application for reissue filed August 12, 1931. Serial No. 556,698.

The present invention relates in general to automatic telephone systems, but is more particularly concerned with small exchanges of the type which are commonly used for giving telephone service in factories, commercial establishments and the like; and the object of the invention, broadly stated, is the provision of a private automatic exchange system embodying new features and novel circuit arrangements which are better adapted to meet the service requirements of systems of this character.

According to the invention an attendant operator is employed at the private automatic exchange to complete all connections from the main to the branch exchange. All connections in the other direction from the private automatic to the main exchange are completed automatically though if need be the operator may complete the connection.

A feature of the invention relates to the provision of an improved large capacity connector switch which has access to trunk lines extending to private automatic exchanges.

Another feature of the invention concerns itself with the provision of a novel trunk circuit extending from the main to the branch exchange so that if a trunk becomes open or grounded it is automatically made busy in both exchanges.

A further feature of the invention relates to the provision of a novel cord circuit at the attendant operator's position provided with improved means for giving supervision.

Still another feature of the invention provides means for automatically rendering the trunk line accessible in either the main or branch exchange for a call in either direction when the calling subscriber at the main exchange replaces his receiver, notwithstanding that the operator may have the plug of a cord circuit in the associated jack.

Other features of the invention relate to the provision of means whereby when a call is extended from the main to a branch exchange subscriber through an operator's cord circuit at the branch exchange the replacement of the receiver at the called substation causes the release of the connection both in the main and branch exchanges and renders the trunk line connecting these exchanges accessible for calls in either direction; and to the novel arrangement whereby when a connection is extended by the operator in the branch exchange to a subscriber in the main exchange the replacement of the receiver at the called substation in the main exchange causes the release of the connection and the trunk line from the main to the branch exchange is rendered accessible for calls in either direction even though the attendant operator's cord circuit remains in the jack associated with this trunk line.

There are other objects of the invention not now specifically mentioned which together with the foregoing will be described fully hereinafter reference being had to the accompanying drawings forming a part of this specification.

Figure 2:
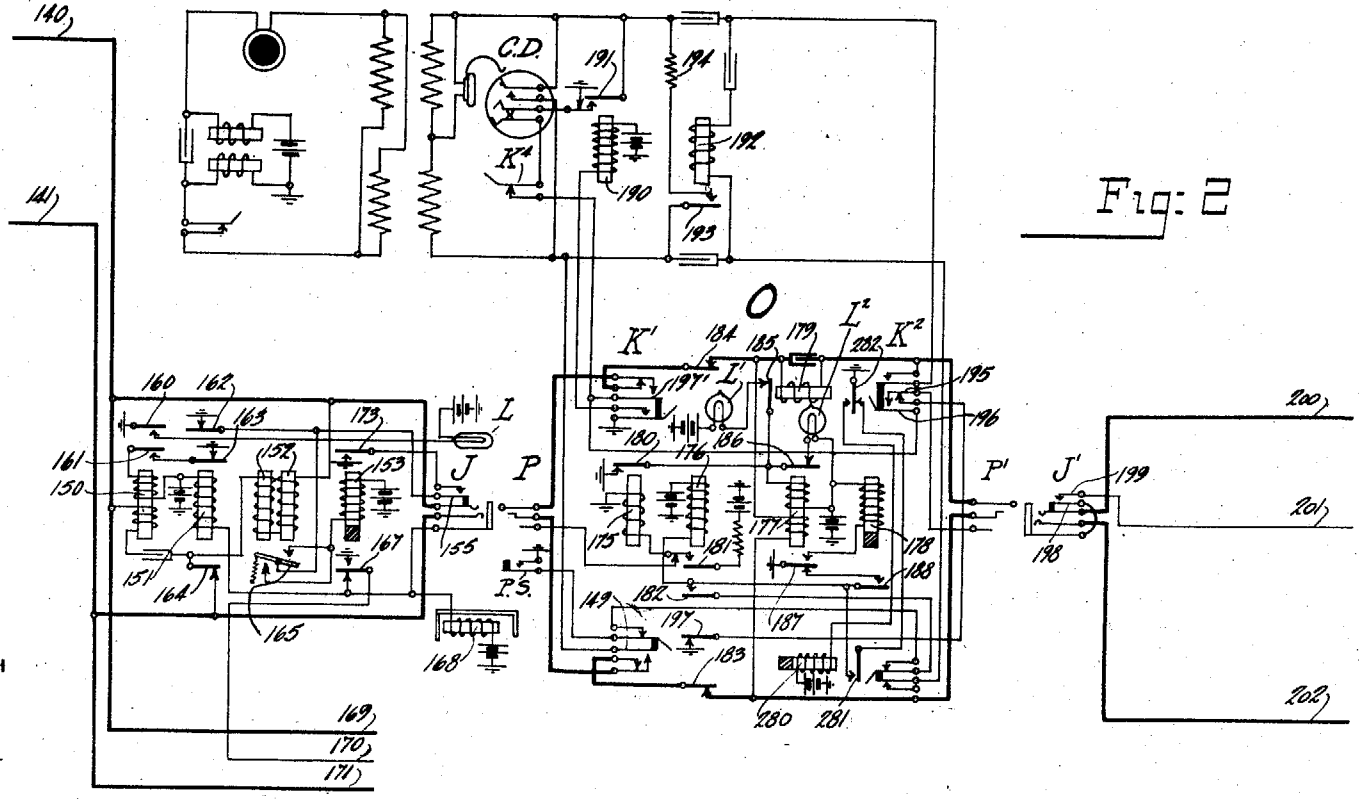
Figure 3:
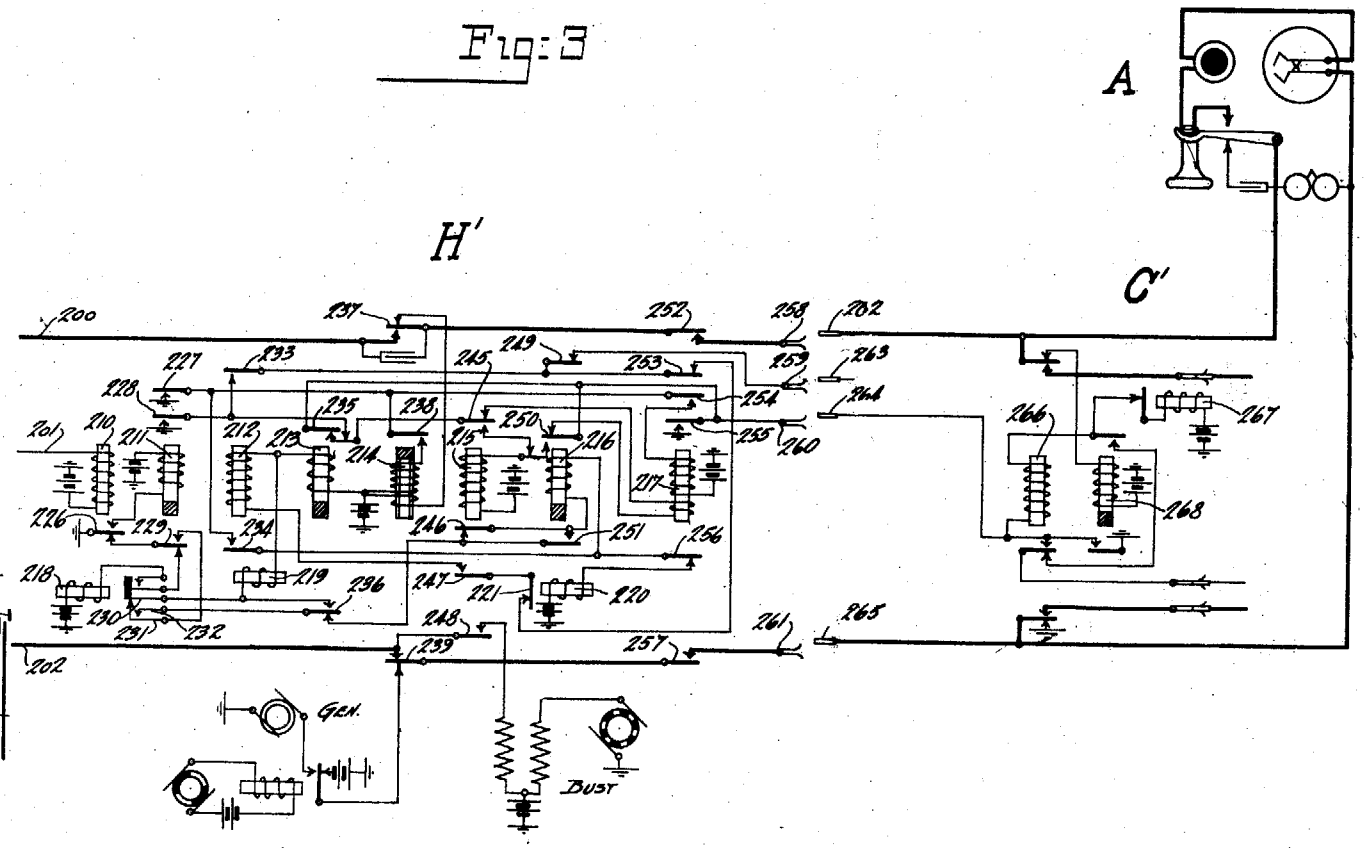

Referring now to the drawings comprising Figs. 1, 2, and 3, there is shown by means of the conventional circuit diagrams enough of the apparatus to fully illustrate the invention. This apparatus includes a large capacity rotary connector switch H, Fig. 1, in the main exchange, a trunk line comprising conductors 140 and 141 extending to the private automatic exchange, a cord circuit O, Fig. 2, a connector switch H′, Fig. 3, and a subscriber's station A in the private branch exchange.

Referring now more particularly to Fig. 1, the connector switch H is of the same general mechanical construction as that of the well known Strowger switches, but differs from them inasmuch as it is provided with an extra set of wipers and associated bank contacts; thus the connector H, which has twenty levels, has access to 200 lines and is capable of testing, after selecting a group of lines, for an idle line in two levels simultaneously. One of the trunk lines extending to a private automatic exchange to which the connector switch H has access is shown in the drawings terminating in the bank contacts 106–108, inclusive.

This trunk line is of the two way type, that is, it is adapted to be used for calls from the main to the branch exchange or from the branch to the main exchange. In order to enable a call to be extended from the branch to the main exchange the trunk line comprising conductors 140 and 141 is provided with a line switch C in the main exchange. This line switch is the usual rotary type of mechanical construction the circuits of which have been modified in accordance with features of the invention and has access to trunk lines extending to first selector switches in the main exchange.

The trunk line comprising conductors 140 and 141 terminates in the jack J, Fig. 2, in the private automatic exchange. This trunk line also terminates in multiple bank contacts in the outgoing levels of the local connector switches. This arrangement is not shown in the drawings but is well known and need not be described, it being sufficient to say that the conductors 169–171, inclusive, associated with the trunk line comprising conductors 140 and 141 extend to the local connector selector repeater switches and are multipled therein in the usual manner.

At O, Fig. 2, is shown a cord circuit at the attendant operator's position in the private automatic exchange. This cord circuit is one of a plurality located at the attendant operator's position which is used for extending incoming calls from a main exchange to a branch exchange subscriber.

The jack J′ is the terminal of a trunk line extending to an incoming connector switch which is shown at H′, Fig. 3.

The connector H′ is of the usual Strowger type having access to local subscriber's lines such as that of the substation A.

The substation A is of the well known automatic type having the usual talking instrumentalities and impulse sending device, the associated line of which terminates at the exchange in the line switch C′.

The line switch C′ is similar to the line switch C, Fig. 1, already described.

Having briefly described the apparatus shown in the drawings a detailed description of its operation will now be given. For this purpose it will be assumed that a subscriber in the main exchange desires to extend a connection to a subscriber A in the private automatic exchange. It will be assumed further that the subscriber in the main exchange has removed his receiver and operated his calling device in order to cause the operation of his individual line switch and the necessary number of selector switches in the main exchange to extend the connection to the trunk line terminating in the connector H, Fig. 1, and comprising conductors 10–12, inclusive.

As soon as the connection is extended to the connector H the line relay 16 thereof is energized over the two sides of the calling subscriber's line in series and, upon operating, closes the circuit of its associated slow acting relay 17. Relay 17, upon energizing, at its armature 37 places ground upon conductor 51 in the connector H in order to provide a locking circuit for certain relays which become operated subsequently, at its armature 39 opens a point in the circuit of the release magnet 102, at the front contact of this armature prepares the impulsing circuits of the connector H and at armature 38 places ground upon the release trunk conductor 11 thereby establishing in the usual manner a holding circuit for the previously operated switches.

The calling subscriber may now operate his calling device for the next digit of the desired number thereby producing a series of interruptions in the circuit of the line relay 16 which retracts its armature a plurality of times in response thereto. At the first retraction of its armature an impulse of current is sent over a circuit extending from ground by way of armature 52 and its back contact armature 39 and its front contact, off normal springs 41 and 40, through the winding of the slow acting low resistance relay 18, and thence through the winding of the vertical magnet 101 to battery. The above is the circuit over which the first impulse to the vertical magnet is transmitted. However, upon the first vertical step of the switch the off normal springs are shifted and the remaining vertical magnet impulses traverse a different circuit which is the same as the one previously traced except that it includes the off normal springs 41 and 42 and armature 43 and its front contact, relay 18 being now in an operated position. The vertical magnet 101 operates to raise the switch shaft carrying the two sets of wipers 103–105, inclusive, and 109–111, inclusive, step by step until these wipers stand opposite the levels of bank contacts corresponding to the digit dialled. The slow acting relay 18 is energized in series with the vertical magnet, maintains its armature attracted throughout the vertical operation of the switch and at the termination thereof deenergizes thereby transferring the impulsing circuit to the rotary magnet 98.

The calling subscriber, upon operating his calling device for the next and final digit of the desired number, causes the line relay 16 to retract its armature a number of times corresponding to the digit dialled. At each retraction of its armature 52 an impulse of current is sent over the following path: from ground through the said armature and its back contact, armature 39 and its front contact, off normal springs 41 and 42, armature 43 and its back contact, back contact and armature 66, through the winding of the slow acting relay 27, armature 91 and its back contact, and through the winding of the rotary magnet 98 to battery. The rotary magnet 98 operates to rotate the switch shaft carrying the two sets of wipers into engagement with the proper sets of bank contacts in which terminate the first two trunk lines extending to the desired private automatic exchange which we will assume are the bank contacts 106–108, inclusive, and 112–114, inclusive. The slow acting relay 27 is energized in series with the rotary magnet and at its armature 72 closes the circuit of the slow acting relay 29, at its armature 71 short circuits the armature 66 and its back contacts on the busy test relay 26 so as to prevent the rotary magnet circuit being interrupted by a premature energization of relay 26 while the switch wipers are rotating over busy contacts, and at its armature 69 and 70 opens certain points in the automatic rotary testing circuit which will be described fully later. The slow acting relay 29, upon operating, at its armature 80 closes the circuit of the slow acting relay 28, at its armature 79 opens a point in the circuit of the upper winding of switching relay 30, at the front contact of this armature connects the test wiper 104 associated with the upper set of bank contacts to the test relay 26, at its armature 78 opens a point in the circuit of relay 20 and at its armature 77 prepares a point in the testing circuit of the test wiper 110 associated with the second set of wipers. The relay 28, upon energizing, at its armature 76 opens a point in the busy signalling circuit, at its armature 73 opens a point in a circuit of relay 20 and at its armatures 74 and 75 prepares points in the automatic rotary testing circuits.

At this point it will be convenient to explain how the lines of a group are connected in the bank contacts of the rotary connector switches so as to enable these switches to select idle trunk lines in the group after having connected therewith. On all lines over which it is desired that the connector switch rotate if the line is busy the connection of the normal conductors extending from the line switch to the connector banks are reversed. This may be seen by referring to the connection of the normal conductors extending from the line switch C to the bank contacts 106–108, inclusive. That is the conductor 141 which extends from ground in the line switch C is connected to bank contact 106 instead of bank contact 108 and the conductor 140 which is connected to battery in the line switch C extends to contact 108 instead of contact 106. The line switches associated with all the lines which are the end of the group in the rotary connector are changed so that a resistance appears in the private normal conductor as may be seen with reference to the line switch C, that is the connection between the terminals 135 and 136 which normally short circuits the resistance $R^4$ and also the connection which normally short circuits the resistance R′ are removed. These resistances are of about 300 ohms each and are included in the circuit so that should this line be making a call ground will appear on the private normal conductor through this resistance and if a rotary connector switch is rotated into engagement with the bank contacts associated with this line the rotation of the switch will cease and a busy tone will be given to the calling subscriber.

Adverting now to the operation of the connector H when engagement was made with the bank contacts 106–108, inclusive, it will be assumed that the first trunk line of the group which is the trunk line now associated with the first set of wipers 103–105, inclusive, is busy there will be a ground potential on the test contact 107 and the test relay 26 will be energized over the following circuit: Grounded, test contact 107, test wiper 104, armature 79 and its front contact, armature 90 and its back contact, and thence through the winding of the test relay 26 to battery. Relay 26, upon energizing, at its armature 65 prepares a point in its locking circuit which is established immediately upon the deenergization of the slow acting relay 29, at armature 66 opens a point in the circuit of the rotary magnet, at armature 67 prepares a point in the circuit of switching relay 31, at armature 68 prepares a point in the busy signalling lead, at its armature 64 switches the connection of the test relay 20 from the first set of wipers to the second set for a purpose which will appear later and at its armature 63 closes a point in the circuit of the test relay 25. Assuming that the second trunk line of the group is busy a ground potential will be present on the test contact 113. A circuit for the testing relay 25 may now be traced from grounded test contact 113, test wiper 110, armature 77, and its front contact, armature 63 and its front contact and through the winding of relay 25 to battery. Relay 25, upon energizing, at its armature 59 prepares a point in its locking circuit which is completed immediately upon the deenergization of the slow acting relay 29, at its armature 62 opens a point in the circuit of switching relay 31, at armature 284 transfers the circuit of the slow acting relay 17 to ground at armature 283 for a purpose which will be explained later, and at armatures 60 and 61 closes two points in the automatic rotary testing circuit. Immediately upon the deenergization of the slow acting relay 27, a circuit for the both windings of the stepping relay 21 may be traced, the circuit of winding 24 extending from grounded test contact 107, test wiper 104, armature 75 and its front contact, armature 70 and its back contact, armature 61 and its front contact, armature 100 and its back contact, through the winding of the coil 24 and the resistance R to battery, and the circuit of winding 23 extending from grounded test contact 113, test wiper 110, armature 74 and its front contact, armature 69 and its back contact, armature 60 and its front contact, armature 99 and its back contact and through the winding of the coil 23 and resistance R to battery. The relay 21 is energized over this circuit and, upon operating, at its armatures 56 and 57 establishes locking circuits for both its windings 23 and 24, at armature 58 closes the circuit of the rotary magnet 98. Magnet 98 operates to rotate the switch shaft carrying the two sets of switch wipers into engagement with the next two sets of bank contacts and at its armatures 99 and 100 opens the circuits of the coils 23 and 24 of the stepping relay 21. Relay 21 deenergizes thereby opening the energizing circuit of the rotary magnet which deenergizes also. It will be noted that when an impulse of current is sent to the rotary magnet 98 the slow acting relay 29 will receive an impulse of current. Therefore, the slow acting relays 29 and 28 will remain energized to preserve the continuity of the testing circuits.

At this point it is convenient to describe the operation and construction of the stepping relay 21. Relay 21 is a relay of the so called shunt field type, that is, it does not attract its armature with only one coil energized as the relay armature is short circuited by the soft iron core of the other coil. However, it will be apparent that when both coils 23 and 24 are energized magnetic flux must flow in a path which includes the relay armature which will thus be attracted. The windings 23 and 24 of the coil 21 are of very low resistance (about 5 ohms) and are in series with resistance coil R which is of somewhat higher resistance (about 50 ohms). The relay is wound in this manner so that if there happens to be a ground potential upon the test contacts through a fairly high resistance say of about 300 ohms, which is the case when the connector wipers engage a busy line which is the last trunk line of the group, it will not be energized. That is, the relay 21 does not attract its armature with one coil energized by a test contact which is directly grounded and the other coil is energized over a circuit which includes a test contact grounded through a resistance of about 300 ohms. It will be observed that under these conditions the winding of the coil energized through 300 ohms is practically short circuited by direct ground through one of the low resistance windings of the relay 21. There is practically no margin to the adjustment of the relay 21 inasmuch as under these conditions which are the most adverse encountered the coil energized through 300 ohms generates practically no magnetic flux and the flux generated by the other coil is short circuited from the relay armature so that it does not operate.

Returning now to the trunk selecting operation of the connector switch H, if the next two trunk lines, which are now associated with both sets of wipers, are rotary trunks and busy, the relays 25 and 26 will be maintained energized and the stepping relay 21 will again operate to close the circuit of the rotary magnet 98. The alternate operation of the stepping relay 21 and the rotary magnet 98 continues until the switch wipers are rotated into engagement with an idle trunk line or a busy trunk line which is the last one of a group. It will be noted that each impulse sent to the rotary magnet 98 also keeps the slow acting relay 29 energized so that the test wipers are maintained connected to their respective testing relays.

Assuming that the upper set of wipers engage a trunk line which is the last of a group ground will be connected to the test contact engaged by the test wiper 104 through a resistance of 300 ohms. This resistance being included in the private normal circuit as will appear fully later. Relay 26 will be maintained energized by the stepping relay 21 will not operate for the reasons stated above and the rotation of the connector switch will cease. The slow acting relays 28 and 29 deenergize and a busy tone is given to the calling subscriber over a circuit extending from the busy machine, back contact and armature 76, front contact and armature 68 to the lower line conductor 12 and thence over the calling subscriber's line. Upon hearing this signal the calling subscriber will replace his receiver thereby initiating the release of the operated switches including the connector H in a manner which will be described subsequently. Where the last trunk line of the group terminates in a set of bank contacts engaged by the upper set of wipers 103–105, inclusive, it is necessary to leave the bank contacts associated with the lower set of wipers open and to ground the test contact of this set in order to secure proper operation of the connector H. However, where there are an even number of trunk lines in the group the last trunk line will terminate in a set of contacts accessible to the lower set of wipers and in this case no special provision is necessary. That is, it is unnecessary to leave any set of bank contacts disconnected from a trunk line. In order to describe the operation in this case it will be assumed that the connector H rotates its wipers 109–111, inclusive, into engagement with the trunk line which is the last of a group. The operation in this case is similar to that above described, that is, the relay 26 remains energized as does the relay 25, the relay 21 remaining inoperative. As relay 21 does not energize the rotation of the switch ceases and a busy signal is given to the calling subscriber.

It will now be assumed that the connector H is rotated until its upper set of wipers are associated with an idle trunk line in the group. Under these conditions there will be no ground potential present upon the test contact engaged by the test wiper 104. Relay 26 deenergizes and opens the circuit of the test relay 25. Then immediately upon the deenergization of the slow acting relay 29 a circuit is completed extending from ground on release trunk conductor 11, armature 65 and its back contact, through the upper winding of the switching relay 30, back contact and armature 96, back contact and armature 79, test wiper 104, test contact associated with it, and thence over the private normal conductor thereof through the winding of the switching relay in the associated line switch and motor magnet to battery. The relay 30 is energized over this circuit, and upon operating, establishes a locking circuit for itself at its armature 88, opens a point in the circuit of the testing relay 26 at armature 90, opens the rotary magnet circuit at armature 91, at armature 89 places direct ground upon the test wiper 104, at armature 87 prepares a circuit for giving the calling subscriber the so called ringing induction and at armatures 86 and 92 completes the ringing circuit. Ringing current is now projected out on the trunk line until a response is obtained. Other results of the energization of relay 30 are that at armature 283 ground is removed from armature 284 for a purpose which will be described, and at armature 285 a locking circuit is prepared for the relay 25.

The above is the operation of the connector H when an idle rotary line is connected with. However, if the idle line engaged by the upper set of wipers is the last trunk line in the group the operation is slightly different. This will now be briefly described. It will be noted that upon the deenergization of the slow acting relay 29, when a circuit is completed for the switching relay 30, a circuit is prepared which extends from battery through the winding of relay 20, normally closed springs controlled by armature 48, armature 64 and its back contact, armature 78 and its back contact, back contact and armature 92, armature 97 and its back contact, to wiper 105. It has been described before how the normal conductors extending from the line switch are reversed in case the line is a rotary line and how if the line is straight they are connected in the usual manner. As it is assumed that the upper set of wipers are now in engagement with a trunk line which is the last of the group there will be ground on the bank contact engaged by the wiper 105 from the back contact of an armature in the associated line switch such as the armature 129 in the line switch C. The relay 20 is therefore energized, and upon operating, at its armature 48 establishes a locking circuit for itself, at its armature 49 removes direct ground from the armature 89 on the switching relay 30 and at its armatures 47 and 50 reverses the connections between the wipers of the connector and the connections to the ring cut off and back bridge relays 19 and 15, respectively. Upon the energization of the switching relay 30 which occurs in the same manner as before described, ground is placed upon the test contact engaged by the test wiper 104, through the resistance $R^2$ which is of about 300 ohms. The other circuit changes brought about by the energization of the switching relay 30 are the same as before described except that ringing current is now sent over the wipers of the connector H in the opposite direction. This is for a purpose which will appear fully later.

Should the lower set of wipers of the connector H have been the first to engage an idle trunk line the operation of the connector differs from that above described in the following manner: The test relay 26 associated with the upper set of wipers remains energized while the test relay 25 deenergizes. Under these conditions the rotation of the switch is stopped and immediately upon the deenergization of the slow acting relay 28 a circuit is completed extending from ground by way of front contact and armature 67, armature 62 and its back contact, through the upper winding of the switching relay 31, back contact and armature 74, test wiper 110 associated with the lower set of wipers, test contact engaged thereby and thence over the private normal conductor through the switching relay and motor magnet of the associated line switch to battery. The switching relay 31 is energized over this circuit and, upon operating, establishes a locking circuit for itself at armature 94, at this same armature closes a circuit for the lower winding of the switching relay 30 at armature 95 places ground upon the test contact engaged by the test wiper 110, at armature 96 opens a point in the circuit of the upper winding of relay 30 and at armature 93 and 97 disconnects the first set of wipers and connects up the second set. The energization of the switching relay 30 produces the same results as before except that ground is disconnected from the armature 89 so that the wiper 104 will remain disconnected from the switch. In the above operation, upon the deenergization of the slow acting relay 28 the discriminating relay 20 is connected with the wiper 111 of the lower set of wipers in order to test whether or not the associated line is the last one of a group. If the associated line is the last one of a group, relay 20 is energized and operates as before described, that is, upon the energization of the switching relays 30 and 31 ringing current will be projected in the opposite direction from the wipers of the connector and ground will be supplied by the test contact engaged by the test wiper 110 through the resistance $R^2$ so that if another connector is rotated into engagement with this line its rotation will be stopped and a signal given to the calling subscriber.

Returning now to the description of the extension of the connection it will be assumed that when the connector H was operated into engagement with the bank contacts 106–108, inclusive, the associated line was idle. Under these conditions the relay 26 is not energized and immediately following the deenergization of the slow acting relay 29 the discriminating relay 20 is connected to the wiper 105 at armature 78 and the circuit of the switching relay 30 is closed at armature 79. As the bank contacts 106–108, inclusive, are associated with the first line of a group extending to the private automatic exchange the connector switch must rotate over it when it is busy and therefore, the normal conductors will be connected in the reverse manner and the discriminating relay 20 will not be energized as the contact 108 is connected to battery in the line switch C. Switching relay 30 is energized over the following circuit: ground on release trunk conductor 11, armature 65 and its back contact, through the upper winding of switching relay 30, back contact and armature 96, back contact and armature 79, test wiper 104, test contact 107, through the winding of the switching relay 121 and the motor magnet 125 of the line switch C to battery. Relay 121 is energized over this circuit. However, its operation at this time is only effective to open its back contacts but not to close its working contacts on account of a mechanical interlocking device controlled by the armature of the line relay 123 which is now normal. The operation of relay 121 disconnects the normal battery and ground connections in the line switch C from the trunk conductors 140 and 141.

In the connector H relay 30, upon operating, makes certain circuit changes in a manner which has already been described, these being among others: Ground is placed upon the test contact 107 and the ringing circuit is closed. Ringing current is now intermittently projected over the trunk line comprising conductors 140 and 141 extending to the private automatic exchange. It will be noted that ringing current leaves the wiper 103 and returns to the wiper 105. The operation of the relay 121 in the line switch C, as before stated, removes the normal battery connection from the trunk line comprising conductors 140 and 141. Since the conductors 140 and 141 are reversed in the bank contacts of the connector H the battery supplied by the connector H superimposed on the ringing current is of the opposite polarity to that normally supplied by the line switch C when the trunk line is not in use. The relay 152 in the trunk circuit associated with this trunk line at the private automatic exchange is a high resistance polarized relay normally energized by battery on the trunk in series with the windings of the line relay 123 and the relay 122 and consequently it will retract its armature 165 whenever battery is removed from the trunk or reversed thereover. Thus as soon as the trunk line is seized by the connector H the relay 152 will retract its armature. Upon deenergizing, relay 152 completes a circuit extending from ground by way of back contact and armature 162, armature 165 and its resting contacts and thence through the winding of the slow acting relay 153 to battery. Upon energizing, this latter relay at armature 167 places ground upon the release trunk conductor 170 extending to multiple test contacts associated with this trunk line in the outgoing level of the local connector switches thereby making this trunk line busy to any outgoing calls and at armature 173 prepares a point in its locking circuit. The relay 150 in this trunk circuit is bridged across the conductors 140 and 141 in series with a condenser and is operated by the ringing current from the connector H. Relay 150, upon energizing, establishes a locking circuit for itself at its armature 161 and at its armature 160 closes the circuit of the line lamp L. Upon noting this signal, the attendant operator will insert the plug of an idle cord circuit, which we will assume is the plug P of the cord circuit O, into the jack J. By this operation a circuit is completed extending from ground through the winding of the low resistance relay 175, normally closed springs controlled by armature 181, sleeve of plug P, sleeve of jack J and through the winding of relay 151 to battery. The relays 175 and 151 are energized over this circuit. Relay 151, upon operating, at its armature 163 opens the locking circuit of the ring up relay 150, at its armature 164 removes the polarized relay 152 as well as the lower winding of the ring up relay 150 from bridge of the trunk conductors 140 and 141 and at its armature 162 removes one ground connection from the armature 165 of the polarized relay. This latter operation is ineffective at the present time as ground has been connected to the armature 165 by the operation of spring 155 of jack J. The visual signal 168 is energized in multiple with relay 151. However, its operation is without function at the present time. In the cord circuit O, relay 175 at its armature 180 closes the circuit of the polarizing winding of the electropolarized relay 177 and also the circuits for the supervisory lamps L′ and $L^2$. It will be noted that the lower winding of the polarized relay 177 is bridged directly across the cord circuit and consequently across the trunk line comprising conductors 140 and 141. The ring cut off relay 19 in the connector H is therefore energized in series with the lower winding of relay 177. Upon operating, relay 19 establishes a locking circuit for itself at armature 45, at armatures 44 and 46 opens the ringing circuit and at the front contacts of these armatures connects up the back bridge relay 15. Back bridge relay 15 is also energized over the trunk line and upon operating, reverses the normal current flow over the incoming trunk lines comprising conductors 10 and 12 for supervisory or metering purposes. Another result of the energization of relay 15 is that a circuit is closed at armature 32 for the slow acting relay 33. Upon operating, the latter relay at armature 34 prepares a circuit for the relay 25 in order to prepare a release circuit for the connector which will be explained hereinafter. In the cord circuit O the electropolarized relay 177 is energized in series with the ring cut off relay 19 as the current flow from the connector H is in the proper direction to operate it. Upon operating, relay 177 at its armature 186 opens the circuit of the supervisory lamp $L^2$ and at its armature 187 closes the circuit of the slow acting relay 178. Relay 178, upon operating, prepares a circuit for the relay 176 at armature 188. The attendant operator will now throw the listening key $K^2$ thereby associating her head set with the cord circuit and enabling her to ascertain what number the calling subscriber in the main exchange desires. Should the attendant operator plug into the jack J with the listening key $K^2$ thrown she would likely get a ring in the ear were not special provisions made to prevent this. If ringing current is being impressed on the trunk line when the operator plugs in the jack J with the key $K^2$ operated the alternating current relay 192 associated with her head set would be energized. Upon operating, relay 192 at armature 193 short circuits the right hand winding of the repeating coil through the resistance 194. This prevents any disagreeable noises in the operator's head set due the ringing current. When the attendant operator finds out what number is desired she will insert the plug P′ into an idle jack which we will assume is the jack J′ extending to the incoming connector switch H′, Fig. 3. By this operation a circuit is completed for the line relay 210 of the connector H′ over the following path: from ground by way of normally closed springs controlled by armature 191, impulse springs of the calling device CD, springs of the release key $K^4$, spring 196 and its working contact, sleeve of plug P′, sleeve of jack J′, springs 198 and 199, conductor 201 and through the winding of the line relay 210 of the contactor H′ to battery.

The relay 210 is energized over this circuit and, upon operating, closes the circuit for its associated slow acting release relay 211. Upon operating, the latter relay opens the release magnet circuit at armature 229, at the front contact of this armature prepares the operating circuits of the connector H′ and at armatures 227 and 228 prepares certain circuits for other relays in the switch.

It will be noted that the line relay 210 is not connected directly to the sleeve of the jack J′ but is connected through the springs 198 and 199. The connection is made in this manner so that there will be no so called preliminary impulse sent to the line relay 210 due to a contact being made between the tip of the plug P′ and the sleeve of the jack J′ while the plug is being inserted into the said jack. Ground is present on the tip of the plug P′ being supplied by the winding of the back bridge relay 15 of the connector H in the main exchange. By this arrangement no impulses will be sent to the line relay 210 until the operator operates her calling device.

The attendant operator may now operate the calling device CD in accordance with the first digit of the desired subscriber's number thereby producing a corresponding series of interruptions in the above traced circuit of line relay 210 which deenergizes a plurality of times in response thereto. At the first retraction of its armature 226 a circuit is completed extending from ground by way of the said armature and its back contact, armature 229 and its front contact, off normal springs 231 and 230 through the winding of the vertical magnet 219 and then through the winding of the slow acting relay 213 to battery. The above is the circuit over which the first impulse to the vertical magnet is transmitted. Upon the first vertical step of the shaft the off normal springs are shifted and the remaining vertical magnet impulses are sent over a circuit which is different from the one previously traced inasmuch as it includes the off normal springs 231 and 232 and armature 236 and its front contact, relay 213 being now in an operated position. Magnet 219 operates to raise the switch wipers 258–261, inclusive, step by step until they are placed opposite the level of bank contacts in which is located the terminals of the substation A. The slow acting relay 213 which is energized in series with the vertical magnet maintains its armature attracted throughout the vertical movement of the switch and at its termination retracts its armatures and transfers the impulsing circuit to the rotary magnet 220.

The private automatic exchange operator may now operate her calling device in accordance with the final digit of the called subscriber's number . As before, a series of interruptions is produced in the circuit of line relay 210 which deenergizes a plurality of times in response thereto. Upon each deenergization, a circuit is completed extending from ground by way of armature 226 and its back contact, armature 229 and its front contact, off normal springs 231 and 232, armature 236 and its back contact, back contact and armature 246, through the winding of the slow acting low resistance relay 216, armature 256 and its back contact, and hence through the winding of the rotary magnet 220 to battery. Magnet 220 operates to rotate the wipers 258–261, inclusive, into engagement with the bank contacts associated with the line of the desired called substation A which we will assume are the bank contacts 262–265, inclusive. The slow acting relay 216 is energized in series with the rotary magnet and operates to connect the test wiper 260 to the test relay 215. If the desired subscriber's line should be busy at this time a ground potential will be found on the test contact 264. A circuit may then be traced extending from the said grounded test contact by way of test wiper 260, armature 250 and its front contact and through the winding of the test relay 215 to battery. Relay 215 energizes over this circuit and operates to establish a point in its locking circuit at armature 245, this being completed upon the deenergization of the slow acting relay 216, at armature 246 opens the circuit of the rotary magnet, at armature 247 prepares an automatic testing circuit which will be described later and at armature 248 places a busy tone on the lower heavy talking conductor 202. This tone will be audible to the attendant operator and the calling subscriber and will serve to inform them that the desired line is busy. Should the calling subscriber in the main exchange now desire a connection with another subscriber in the private automatic exchange he may inform the attendant of this fact. The attendant operator will then operate the release key $K^4$ thereby opening the circuit of the line relay 210 of the connector H′. When this relay deenergizes the slow acting release relay 211 deenergizes shortly after and the condenser H′ is released in the well known manner. The operator may now, by operating her calling device for the digits of the desired subscriber's number, cause the connector H′ to connect with the desired lines. The operation in this case is similar to that just described and will be readily apparent. However, should the calling subscriber in the main exchange replace his receiver upon hearing the audible busy signal the connection will be released in a manner which will be described hereinafter.

It will now be assumed that the line of the substation A is idle when the wipers of the connector H′ are rotated into engagement with the bank contacts 262–265, inclusive. Under these conditions there will be no ground on the test contact 264 and the test relay 215 is not operated. Then, following the deenergization of the slow acting relay 216, a circuit is completed extending from ground by way of front contact and armature 228, normally closed springs controlled by armature 235, armature 245 and its back contact, through the lower winding of the switching relay 217, back contact and armature 250, test wiper 260, test contact 264, through the winding of the switching relay 266 and motor magnet 267 of the line switch C′ to battery. The relays 217 and 266 operate over this circuit. However, due to a mechanical interlocking device controlled by the armature of the line relay 268 which has not been energized, the switching relay 266 only attracts its armatures enough to disconnect the line of the substation A from its normal battery and ground connections in the line switch C′.

In the connector H′, the switching relay 217, upon energizing, establishes a locking circuit for itself at its armature 254, places ground upon the test wiper 260 at armature 255, opens the rotary magnet circuit at armature 256 and at armatures 252 and 257 completes the ringing circuit.

Having completed the desired connection the attendant operator may now restore the listening key $K^2$. This operation disconnects her head set from the connection and enables her to attend to other calls. By the restoration of key $K^2$ the circuit of the line relay 210 of the connector H′ is transferred to ground through the springs 195 and armature 197 of relay 176 and its back contact for a purpose which will appear subsequently.

In the connector H′, ringing current is now intermittently applied to the line of the substation A until an answer is obtained. When this occurs a circuit is completed over the called subscriber's line for the ring cut off relay 214. Upon energizing, this relay establishes a locking circuit for itself at armature 238, at armatures 237 and 239 opens the ringing circuit and at the front contact of these armatures finally completes the talking connection.

When the ring cut off relay 214 energizes a direct metallic circuit extends from the back bridge relay of the connector H in the main exchange to the substation A. The current flowing over this circuit serves to energize the relay 179 in the cord circuit O. Relay 179, upon energizing, opens the circuit of the called supervisory lamp L′ thereby notifying the attendant operator that the called subscriber has answered and closes the circuit of the slow acting relay 280 at armature 282. Upon operating relay 280 prepares a circuit for relay 176 at armature 281. The conversation may now be carried on over the heavy talking conductors between the subscriber in the main exchange and the subscriber at substation A, battery being supplied to the subscriber in the main exchange from the windings of the line relay 16 of the connector H and to the called subscriber at substation A in the private automatic exchange from the windings of the back bridge relay 15 of the connector H.

At this point it will be convenient to describe the operation of the local connector H′ when it operates to select an idle line in a group of lines. In order to arrange the connector H′ to give this class of service two test wipers are provided. In order to enable the switch to discriminate between private and rotary busy lines the test contacts of the latter engaged by the two test wipers must be tied together and those of the last trunk line in the group or those of private lines left open. Assuming that the connector H′ is rotated into engagement with such a group of lines and that the first line thereof is busy. Under these conditions there will also be a ground potential on the test contact engaged by the test wiper 259 as well as the test wiper 260. A circuit is now completed extending from the grounded test contact engaged by the test wiper 259, over said test wiper, back contact and armature 249 armature 253 and its back contact, back contact and armature 221, armature 247 and its front contact, through the winding of the stepping relay 212 and thence through the winding of the slow acting relay 213 to battery. The relays 212 and 213 are energized over this circuit. Relay 213, upon energizing, again connects the test wiper 260 to the test relay 215 at armature 235. Relay 212, upon energizing, establishes a locking circuit for itself and relay 213 at armature 233 and at armature 234 completes the circuit of the rotary magnet 220. Magnet 220 operates to rotate the switch wipers 258–261, inclusive, into engagement with the next set of bank contacts in the selected group, and at armature 221 opens the locking circuit of the relays 212 and 213. Upon deenergizing, relay 212 opens a circuit of the rotary magnet 220 which deenergizes also. If this next trunk line is not the last one of the group and is busy the test relay 215 will be maintained energized and the stepping relay 212 will operate as before. The alternate operation of the stepping relay 212 and the magnet 220 continues until an idle line is found or until the switch wipers are rotated into association with the last trunk line of the group. If this is busy also test relay 215 will be maintained energized. However, no circuit will be completed for the stepping relay 212 and as ground is not present on the test contact engaged by the upper test wiper 259 the rotation of the switch ceases and a busy tone is given to the calling subscriber. In case the connector H′ is rotated into engagement with an idle trunk line the operation proceeds as before described.

Referring back to the description of the extension of the connection, when the conversation is terminated both the subscribers will replace their receivers upon their respective switch hooks. In order to describe the releasing operation in detail it will be assumed that the called subscriber at substation A replaces his receiver before the calling subscriber in the main exchange. When the receiver is replaced at substation A the circuit of the supervisory relay 179 in the operator's cord circuit O is opened and this relay deenergizes. Upon retracting its armatures, a circuit is closed for the lamp L′ in order to notify the operator that the called subscriber has replaced his receiver and at armature 282 the circuit of the slow acting relay 280 is opened and before the deenergization of this latter relay an impulse of current is sent over a path extending from ground by way of the said armature and its back contact, armature 281 and its front contact, and through the winding of relay 176 to battery. Relay 176, upon operating, at its armature 181 disconnects ground from the sleeve of the plug P, at the front contact of this armature establishes an auxiliary circuit for the sleeve relay 175, at armature 182 establishes a locking circuit for itself, opens the circuit of the line relay 210 of the incoming connector switch H′ at armature 197 and at armatures 184 and 183 disassociates the cord circuit O from the jack J. As a result of this latter operation the circuit of the back bridge relay 15 in the connector H at the main exchange is opened. Upon retracting its armatures relay 15 restores the normal flow of current over the conductors 10 and 12 of the incoming trunk line and at armature 32 opens the circuit of the slow acting relay 33. After the deenergization of relay 15 and before the deenergization of relay 33 an impulse of current is sent over a circuit extending from ground by way of armature 32 and its back contact, front contact and armature 34, and through the winding of the relay 25 to battery. A circuit in multiple with the above is completed for the slow acting relay 29. The operation of relay 29 at this time serves merely to remove one ground connection from the release trunk conductor 11. Upon energizing, relay 25 at its armature 59 establishes a locking circuit for itself and relay 29 to ground on conductor 51 and at armature 284 opens the circuit of the slow acting relay 17, The operation of the other armatures of relay 25 are without function at the present time. Upon the deenergization of the slow acting relay 17 ground is removed from the release trunk conductor 11 thereby opening a holding circuit of the previously operated switches in the main exchange and the circuit of the release magnet 102 of the connector H is prepared. Immediately upon the deenergization of the relay 25 which takes place as soon as its locking circuit is opened by the deenergization of the slow acting relay 17 magnet 102 operates to restore the connector H to its normal position in the usual manner.

Returning now to the description of the circuit operations in the private automatic exchange the results occasioned by the disconnection of ground from the sleeve of the plug P will now be considered. When ground is disconnected from the sleeve of plug P the circuit of the relay 151 in the trunk equipment is opened as is the circuit of the visual 168. Relay 151, upon deenergizing, at its armature 164 again bridges the lower winding of the ring up relay 150 and the windings of the high resistance polarized relay 152 across the trunk conductors 140 and 141. It will be understood that when the connector H in the main exchange was released that the cut off relay 121 in the line switch C is deenergized to again connect the normal battery to the trunk conductors 140 and 141. As this battery flows in the opposite direction to that supplied by the connector H the polarized relay 152 in the trunk circuit at the private automatic exchange is energized. Upon attracting its armature, relay 152 opens the circuit of the slow acting relay 153. Upon deenergizing, the latter relay removes ground from the release trunk conductor 170 associated with the multiples of the incoming trunk line comprising conductors 140 and 141 in the banks of the local connector switches. The two way trunk line shown in the drawings may now be used for a call in either direction even though the plug P remains in the jack J and the operator will be given full supervision in a manner which will be described subsequently.

It will be remembered that relay 176 in the cord circuit O also opens the circuit of the line relay 210 of the incoming connector H′. Upon deenergizing, this latter relay opens the circuit of the associated slow acting relay 211. Upon retracting its armatures, the latter relay opens certain locking circuits in the connector H′ and closes the circuit of the release magnet 218. The release magnet 218 operates to release the connector in the usual manner.

The private automatic exchange operator upon noting the lighting of the lamp $L^2$ will withdraw the plugs of the cord circuit from their associated jacks. Upon the plug P reaching its normal position the locking circuit of the relay 176 is opened and this relay deenergizes to open the circuit of the relay 175 and restore certain other circuits in the cord circuit to normal.

Adverting back to the description of the extended connection it will be assumed that the calling subscriber in the main exchange is the first to replace his receiver. When the receiver is replaced at the calling substation the circuit of the line relay 16 in the connector H is opened. This relay deenergizes and in turn opens the circuit of the slow acting release relay 17. Upon retracting its armatures the latter relay removes ground from the release trunk conductor 11 thereby allowing the preceding switches to release, at armature 37 opens the locking circuit of the various relays in the connector H and at armature 39 completes the circuit of the release magnet 102. Magnet 102 operates to restore the connector H to normal. As soon as ground is removed from the test contact 107 associated with the trunk line comprising conductors 140 and 141, the cut off relay 121 in the line switch C retracts its armatures thereby again connecting the normal battery to the trunk line. This battery flows in the opposite direction to that which has been supplied by the connector H. Current is now reversed in the lower winding of the electro-polarized relay 177 and this relay retracts its armatures. Upon so doing, relay 177 at armature 186 establishes the circuit of the supervisory lamp $L^2$ which notifies the attendant that the calling subscriber has replaced his receiver and at armature 187 opens the circuit of the slow acting relay 178. After the deenergization of the polarized relay 177 and before the deenergization of the slow acting relay 178 an impulse of current is sent over a circuit extending from ground by way of armature 187 and its back contact, front contact and armature 188 and through the winding of the relay 176 to battery. Relay 176 operates in the same manner as before to establish a locking circuit for itself at armature 182, to open at armature 197 the circuit of the line relay 210 of the connector H′, to open at armature 181 the circuit of the busy visual 168 associated with the trunk circuit and also that of relay 151 and at the front contact of this armature to establish another circuit for the sleeve relay 175. Another result of the energization of relay 176 is that at armatures 183 and 184 the cord circuit is disconnected from the trunk even though the plug P remains in the jack J. As the circuit of the line relay 210 of the incoming connector H′ is opened the release of the connector H′ takes place as before described. As the circuit of the relay 151 in the trunk equipment associated with the jack J is also opened by the operation of relay 176 this relay will deenergize to again connect the lower winding of the ring up relay and the windings of the high resistance polarized relay 152 across the trunk conductors 140 and 141. The polarized relay 152 is immediately energized and operates to open the circuit of the slow acting relay 153. The latter relay deenergizes after a short interval and again renders the multiples of the trunk line accessible in the local connector switches by removing ground from the release trunk conductor 170. The trunk line comprising conductors 140 and 141 is now free and may be used for calls in either direction even though the plug P remains in the jack J and the ordinary supervisory call signal operates just the same as if the plug P were out of the jack.

In response to the lighting of the supervisory lamps L′ and $L^2$ the operator will withdraw the plugs of the cord circuit from the jacks J and J′ as before described. When the plug P reaches its normal position the plug seat switch PS is operated and the locking circuit of the relay 176 is opened. Upon deenergizing, this relay opens the circuit of the sleeve relay 175 and restores certain other circuits to normal. However, should the attendant be busy and leave the plug in the jack for some time after the operation of the supervisory signals the trunk line comprising conductors 140 and 141 may still be used for calls in either direction as has already been indicated. The operation under these conditions will now be described.

If the trunk line is again seized in the main exchange the polarized relay 152 is energized to busy the trunk line to the local switches in the private automatic exchange and the ringing current impressed upon the trunk line operates the ring up relay 150 in the same manner as before. Relay 150 locks itself energized and closes the circuit of the supervisory lamp L. Under these conditions the operator has only to operate the listening key $K^2$ in order to answer the call. By this operation the cord circuit is associated with the trunk as the locking circuit of the relay 176 is opened and all circuits are now in the same condition as if the operator had answered the call by plugging into the jack.

Should the trunk line be seized for an outgoing call from the private automatic to the main exchange ground will be placed upon the conductor 170 by the local connector selector repeater thereby energizing the relay 151 of the trunk circuit in multiple with the busy visual 168. The operation of the visual 168 serves to notify the operator that the trunk line is being used for an outgoing call. Relay 151 operates to remove the lower winding of the ring up relay 150 and the high resistance polarized relay 152 from bridge of the two trunk conductors 140 and 141. The line relay 123 of the line switch C associated with the seized trunk line in the main exchange is immediately energized via a direct current bridge in the connector selector repeater and operates to close the circuit of the switching relay 121 in series with the motor magnet 125. It will be noted that the test wiper 143 is normally connected through a back contact on switching relay 121 to a point in the above circuit midway between the switching relay and the motor magnet. Thus it will be seen that as soon as the trunk line with which the switch wipers of the line switch C are associated becomes busy the ground potential on the test contact engaged by test wiper 143 causes the operation of the motor magnet 125. Thus it will be seen that the wipers of the line switch are always associated with an idle trunk line or else are being operated in search of one. That is, the rotary line switch C preselects its trunks.

Returning now to the operation of the line switch C when the trunk line comprising conductors 140 and 141 was seized in the private automatic exchange the line relay 123 energizes as before described and closes the circuit of the switching relay 121. The latter relay, upon operating, extends the seized trunk conductors to the line relay of the selcted first selector at armatures 126 and 129, at armature 127 opens a point in the circuit of relay 124 and at armature 128 prepares a holding circuit for itself. The subsequent operations wherein the connection is extended to the desired called line in response to the digits dialled by the calling subscriber in the private automatic exchange takes place in the usual manner.

The attendant operator sometimes finds it desirable to extend connections to the main exchange for certain subscribers in the private automatic exchange. In order to enable her to do this when the plug of a cord circuit is placed in the jack of an idle trunk line a calling out key such as key K′ in the cord circuit O is provided in all the cord circuits. The operation will now be briefly described when the operator desires to extend a call to a subscriber in the main exchange. When the operator inserts the plug of an idle cord circuit into the jack of an idle trunk line, the plug P into the jack J for example, a circuit is completed for the relay 151 over the sleeve of a cord circuit in multiple with the visual 168. Relay 151 operates to remove the ring up relay 150 and the high resistance polarized relay 152 from bridge of the trunk conductors 140 and 141 as before described. Relay 152 immediately retracts its armature as its circuit is now open. However, its operation is ineffective at the present time to close a circuit of the slow acting relay 153. The multiples of the trunk line comprising conductors 140 and 141 in the banks of the local connector switches are busied by ground through the winding of the low resistance relay 175 over a circuit extending from ground through the winding of relay 175, normally closed springs controlled by armature 181, sleeve of plug P, sleeve of jack J, back contact and armature 167 to release trunk conductor 170. If the operator plugs into the jack with the key K′ thrown the calling device CD is bridged across the conductors 140 and 141. This occurs in the following manner: When the key K′ is operated the relay 190 is energized. Upon operating, this relay at its armature 191 bridges the calling device across the trunk circuit over the circuit extending from conductor 140, tip of plug P, working contact of spring 197′ and the said spring, springs of release key $K^4$ impulse springs of the calling device CD, front contact and armature 191, right hand winding of the repeating coil associated with the operator's head set, spring 149 of key K′ and its working contact, ring of plug P, ring of jack J, to trunk conductor 141. Line relay 123 is immediately energized over this circuit and the line switch C operates to extend the connection to a preselected first selector switch. Should the operator plug in the jack J with the key K′ normal the line relay 123 of the line switch C would be energized in series with the lower winding of electropolarizing relay 177 of the cord circuit O. However, the polarized relay would not be operated at this time as the current in its polarizing winding opposes the current in its other winding, it being of course understood that when the plug P was placed in the jack J relay 175 operated to energize the polarized winding of relay 177 and to light the supervisory lamps L′ and $L^2$.

In response to the digits dialled by the attendant operator in the private automatic exchange a series of automatic switches in the main exchange are operated to extend the connection to the desired called subscriber's line in a well known manner. When the connection is completed the attendant operator will restore the key K′ to normal. When the called subscriber answers the normal current flow is reversed over the trunk conductors 140 and 141 and the electropolarized relay 177 in the cord circuit O is operated to efface the supervisory lamp $L^2$ thereby notifying the attendant that the called subscriber has answered. The attendant operator will now throw the key $K^2$ and inform the called subscriber in the main exchange to hold the line. She will then set up the connection to the party in the private automatic exchange who has asked her to establish the connection. The operation in the establishment of a local connection has already been described and will be readily understood. When the subscriber in the private automatic exchange answers the attendant is informed of this fact by the effacement of the supervisory lamp L′ which occurs upon the energization of the relay 179. If the subscriber in the private automatic exchange replaces his receiver before the called subscriber in the main office, the relay 179 is deenergized, the supervisory lamp L′ lighted, the local incoming connector such as H′ released, and the trunk line freed for use as before described. Should the called subscriber in the main exchange be the first to replace his receiver the normal current flow is again restored over the trunk line comprising conductors 140 and 141 and the electropolarized relay 177 will be deenergized thereby lighting the supervisory lamp $L^2$ to notify the operator that the called subscriber has replaced his receiver and opening the circuit of the slow acting relay 178 and closing the circuit of the relay 176. As before, relay 176 operates to establish a locking circuit for itself, to remove ground from the sleeve of the jack J and to disassociate the cord circuit from the trunk line. As there is now no bridge across the trunk conductors 140 and 141 the operated switches in the main exchange are released in the usual manner and the two way trunk line is rendered accessible for calls in either direction in the same manner as before described. Another result of the energization of relay 176 is that the local connector switch which has been used to establish the connection to the party in the private automatic exchange is released in the same manner as has already been described. Upon noting the operation of the two supervisory lamps L′ and $L^2$ the attendant operator will withdraw the plugs of the cord circuit O from the jack J and J′. When the plug P reaches its normal position the plug seat switch PS is operated and the locking circuit of the relay 176 of the cord circuit is opened. Upon deenergizing, this relay opens the circuit of the sleeve relay 175 and restores certain other circuits in the cord circuit to normal.

It will now be convenient to describe certain features of the trunk circuit comprising conductors 140 and 141 interconnecting the main and branch exchanges whereby if the trunk line becomes either open or grounded it is automatically made busy at both ends and an alarm signal given to the exchange attendant in the main exchange. It will be noted that the energizing circuit for the high resistance polarized relay 152 includes the line relay 123 of the line switch C associated with the trunk line in the main exchange and also the right and left hand windings of the shunt field relay 122. The construction of the relay 122 is similar to that of the relay 21 in the connector H already described. The relays 122 and 152 are energized over this circuit. However the line relay 123 remains inoperative due to the high resistance of the polarized relay 152 and the shunting effect of the relay 122. Now should the trunk circuit become opened relays 122 and 152 will denergize. Relay 152 upon deenergizing, closes the circuit of the slow acting relay 153. The latter relay operates to place a busy potential upon the multiples of the trunk line in the banks of the local connector switches thereby preventing it being seized by a subscriber in the private automatic exchange. Relay 122 upon deenergizing opens the circuit of line relay 123 at its armature 145, and its armature 130 closes the circuit for the lower winding of the relay 124. It will be seen that the relay 124 is slow to energize but quick to deenergize as its upper winding is normally short circuited by armature 138 and its back contact. After a short interval relay 124 energizes and, upon operating, establishes a locking circuit for itself at armature 133 to ground on common conductor 148, places ground upon the multiple test contacts such as 107 in the banks of the rotary connector switches and at armature 132 closes the circuit for an alarm in series with the lamp $L^6$ to notify the attendant that one of the interconnecting trunk lines is in trouble. The lamp $L^6$ is individual to the trunk lines extending to one private automatic exchange and serves to inform the attendant in what group of trunk lines to look for the trouble. When ground is placed on the conductor 120 the relay 121 is energized and operates to disconnect normal battery and ground and the windings of relay 122 from the trunk line conductors 140 and 141 for a purpose which will subsequently be made clear. When the trouble is cleared the attendant will operate the common key K which opens the locking circuit of the relay 124. Upon deenergizing, relay 124 removes ground from the multiple test contacts in the banks of the rotary connector switches. As the trunk line is now in good condition the relay 122 will now be energized to prepare the circuit of the line relay 123 and to open the circuit of the relay 124. If the trunk line should become grounded on either conductor the left hand coil of the relay 122 will be short circuited and this relay will be deenergized thereby opening a circuit of the line relay 123 so that it does not energize at this time at armature 145 and at armature 130 completes the circuit for the slow to operate relay 124. Since relay 122 is disconnected from both trunk conductors 140 and 141, in the manner previously described, current flow to the polarized relay 152 is cut off regardless of which trunk conductor is grounded and this relay therefore deenergizes to busy the trunk line to the local connector switches in the private branch exchange in the same manner as if the trunk were open. Otherwise the operations are the same as have already been described.

Returning now to the connector H it will be remembered that when the connector switch automatically rotated until its wipers were associated with the last trunk line of the group and, if this trunk line is idle, the relay 20 energized. This relay operated to reverse the connections of the ring cut off and back bridge relay with respect to the switch wipers. The reason for this will now become apparent, inasmuch as the normal conductors extending from the line switch to the connector banks in the case of the last lines in a group are not reversed as in rotary lines therefore the wipers of the connector switch must be connected in the opposite manner so as to properly operate the polarized relay 152 in the trunk circuits at the branch exchanges and the electropolarized relay 177 in the cord circuit. By the operation of relay 20 this result is secured the same as if the normal conductors extending from the line switch to the normal connector banks are reversed.

The features of the invention having been fully described what is considered to be new and desired to have protected by Letters Patent will be pointed out in the appended claims.

What I claim as my invention is:

1. In a telephone system, a two way trunk line interconnecting two exchanges, automatic switches in each exchange having access to said trunk line and means operative automatically responsive to said trunk line becoming open for rendering it inaccessible to said automatic switches in both exchanges.

2. In a telephone system, a two way trunk line interconnecting two exchanges, automatic switches in each exchange having access to said trunk line and means operative automatically responsive to said trunk line becoming grounded for rendering it inaccessible to said automatic switches in both exchanges.

3. In a telephone system, a two way trunk line interconnecting two exchanges, automatic switches in each exchange having access to said trunk line and means operative automatically responsive to said trunk line becoming open for signalling an attendant at one of said exchanges.

4. In a telephone system, a two way trunk line interconnecting two exchanges, automatic switches in each exchange having access to said trunk line and means operative automatically responsive to said trunk line becoming grounded for signalling an attendant at one of said exchanges.

5. In a telephone system, a two way trunk line interconnecting two exchanges, automatic switches in each exchange having access to said trunk line and means operative automatically responsive to said trunk line becoming open or grounded for rendering it inaccessible to automatic switches in both exchanges.

6. In a telephone system, a two way trunk line interconnecting two exchanges, automatic switches in each exchange having access to said trunk line and means operative automatically responsive to said trunk line becoming open or grounded for signalling an attendant at one of said exchanges.

7. In a telephone system, a two way trunk line, automatic switches having access to each end of said trunk line, and means operative automatically responsive to said trunk becoming open for rendering it inaccessible to said automatic switches.

8. In a telephone system, a trunk line, means for connecting a calling line with said trunk line, means including an operator's cord circuit for connecting said trunk line with a called line, and means in said cord circuit operative when said calling line is disconnected from said trunk line for disconnecting the called line from said cord circuit.

9. In a telephone system, a trunk line, means for connecting a calling line with said trunk line, means including an operator's cord circuit for connecting said trunk line with a called line, and means controlled from said calling line for disconnecting said called line from said cord circuit.

10. In a telephone system, a trunk line, means for connecting a calling line with said trunk line, means including an operator's cord circuit for connecting said trunk line with a called line, and means including a relay controlled from said calling line for disconnecting said called line from said cord circuit.

11. In a telephone system, a trunk line, means for connecting a calling line with said trunk line, means including an operator's cord circuit for connecting said trunk line with a called line, and means controlled from said called line for disconnecting said called and calling lines from said trunk line.

12. In a telephone system, a trunk line, a calling line, automatic switches controlled from said calling line for seizing said trunk line, an operator's cord circuit for connecting said trunk line to a called line, and means controlled from said called line independent of said calling line for disconnecting said cord circuit from said called line.

13. In a telephone system, a trunk line, a calling line, automatic switches controlled from said calling line for seizing said trunk line, an operator's cord circuit for connecting said trunk line to a called line, and means controlled from said calling line for disconnecting said called line from said cord circuit.

14. In a telephone system, a calling line, a trunk line, automatic switches controlled from said calling line for connecting with said trunk line, means including an operator's cord circuit and automatic switches for connecting said trunk line with a called line, and means controlled from said called line for releasing all of said automatic switches used in said connection.

15. In a telephone system, a calling line, a trunk line, automatic switches controlled from said calling line for connecting with said trunk line, means including an operator's cord circuit and automatic switches for connecting said trunk line with a called line, and means controlled from said calling line for releasing all the automatic switches used in said connection.

16. In a telephone system, a calling line, a trunk line, automatic switches controlled from said calling line for connecting with said trunk line, means including an operator's cord circuit and automatic switches for connecting said trunk line with a called line, means controlled from said called line for releasing all said automatic switches used in said connection, and means controlled by the release of said switches for rendering said trunk line accessible to be used for another call even though said cord circuit remains associated with said trunk line.

17. In a telephone system, a calling line, a trunk line, automatic switches controlled from said calling line for connecting with said trunk line, an operator's cord circuit for connecting said trunk line to a called line, a disconnect signal at said cord circuit, circuit connections controlled by the release of said all automatic switches when the calling line is disconnected for reversing the flow of current over said trunk line and a relay in said cord circuit responsive to said current reversal to control said signal.

18. In a telephone system, a calling line, a trunk line, automatic switches controlled from said calling line for connecting with said trunk line, an operator's cord circuit for connecting said trunk line to a called line, a signalling circuit, circuit connections for releasing said automatic switches and for reversing the flow of current over said trunk line when the receiver is replaced at the called substation and a relay in said cord circuit responsive to said current reversal to control said signal.

19. In a telephone system, a calling line, a trunk line, an operator's position, automatic switches controlled from said calling line for connecting with said trunk line, a signal at said operator's position responsive to such connection, a cord circuit at said position for connecting said trunk line to a called line, means controlled from said called line for releasing said automatic switches to render said trunk line accessible to other calls, and means operative when said trunk line is again seized even though said cord circuit remains associated with said trunk line for operating said signal.

20. In a telephone system, a trunk line terminating in an automatic switch, other automatic switches accessible thereto, an operator's position, means controlled by the operator at said position for seizing said trunk line and for operating the first mentioned switch and a series of said other switches to extend a connection to a called line, means controlled only by said operator for releasing said switches, a calling line, means controlled from said calling line for seizing said trunk line and for operating said first mentioned switch and a series of said other switches to extend a connection to another called line, and means controlled from said other called line for releasing said connection.

21. In a telephone system, a trunk line terminating in an automatic switch, other automatic switches accessible thereto, an operator's position, means controlled by the operator at said position for seizing said trunk line and for operating the first mentioned switch and a series of said other switches to extend a connection to a called line, means controlled only by said operator for releasing said switches, a calling line, means controlled from said calling line for seizing said trunk line and for operating said first mentioned switch and a series of said other switches to extend a connection to said called line, and means controlled from said called line for releasing said connection.

22. In a telephone system, a trunk line terminating in an automatic switch, other automatic switches accessible thereto, an operator's position, means controlled by the operator at said position for seizing said trunk line and for operating the first mentioned switch and a series of said other switches to extend a connection to a called line, means controlled only by said operator for releasing said switches, a calling line, means controlled from said calling line for seizing said trunk line and for operating said first mentioned switch and a series of said other switches to extend a connection to another called line, and means controlled from either the calling or said other called line for releasing said connection.

23. In a plug ending cord circuit for connecting two lines, a relay for opening the talking circuit through said cord circuit, and means responsive to the replacement of the receiver on either connected line for energizing said relay.

24. In a plug ending cord circuit for connecting a calling and a called line, a relay for opening the talking conductors and a sleeve conductor of said cord circuit, and means responsive to the replacement of the receiver on the called line for energizing said relay.

25. In a plug ending cord circuit for connecting two lines, a relay for opening the talking circuit through said cord circuit, means responsive to the replacement of the receiver on one of the connected lines for transmitting a momentary impulse to energize said relay, and a locking circuit for holding said relay energized.

26. In a plug ending cord circuit for connecting two lines, a relay for opening the talking circuit through said cord circuit, means responsive to the replacement of the receiver on one of the connected lines for transmitting a momentary impulse to energize said relay, a locking circuit for holding said relay energized, and means responsive to the manual restoration of the cord to normal for opening said locking circuit.

27. In a plug ending cord circuit for connecting two lines in which each plug has a sleeve contact in addition to the two talking contacts, said cord circuit comprising circuit arrangements whereby electrical potentials are maintained on said sleeve contacts while the cord circuit is in use, a relay for removing said potentials, and means responsive to the replacement of the receiver on either connected line for energizing said relay.

28. In a plug ending cord circuit for connecting two lines in which each plug has a sleeve contact in addition to the two talking contacts, said cord circuit comprising circuit arrangements whereby electrical potentials are maintained on said sleeve contacts while the cord circuit is in use, a relay for removing said potentials, and means responsive to the replacement of the receiver on one of the connected lines for energizing said relay.

29. In a plug ending cord circuit for connecting two lines in which each plug has a sleeve contact in addition to the two talking contacts, said cord circuit comprising circuit arrangements whereby electrical potentials are maintained on said sleeve contacts while the cord circuit is in use, a relay for removing said potentials, means responsive to the replacement of the receiver on one of the connected lines for transmitting a momentary impulse to energize said relay, and a locking circuit for holding said relay energized.

30. In a plug ending cord circuit for connecting two lines in which each plug has a sleeve contact in addition to the two talking contacts, said cord circuit comprising circuit arrangements whereby electrical potentials are maintained on said sleeve contacts while the cord circuit is in use, a relay for removing said potentials, means responsive to the replacement of the receiver on one of the connected lines for transmitting a momentary impulse to energize said relay, a locking circuit for holding said relay energized, and means responsive to the manual restoration of the cord to normal for opening said locking circuit.

31. In a telephone system, means including a cord circuit for connecting two lines, means outside the said cord circuit for supplying talking current to the connected lines, the talking current to the called line flowing over the two strands of said cord circuit in series, means controlled by the calling party for reversing the direction of the flow of talking current to the called line, and means in said cord circuit responsive to the said reversal for opening the talking circuit at said cord circuit.

32. In a telephone system, means including a cord circuit for connecting two lines, means outside the said cord circuit for supplying talking current to the connected lines, the talking current to the called line flowing over the two strands of said cord circuit in series, means controlled by the calling party for reversing the direction of the flow of talking current to the called line, means in said cord circuit for maintaining both connected lines in busy condition, and means in said cord circuit responsive to said reversal for rendering said busy means ineffective.

33. In a telephone system, means including a cord circuit for connecting two lines, means outside the said cord circuit for supplying talking current to the connected lines, the talking current to the called line flowing over the two strands of said cord circuit in series, means controlled by the calling party for reversing the direction of the flow of talking current to the called line, and means in said cord circuit responsive to the said reversal for opening the talking circuit at said cord circuit, said last means including a polarized relay bridged across the talking strands of said cord circuit.

34. In a telephone system, means including a cord circuit for connecting two lines, means outside the said cord circuit for supplying talking current to the connected lines, the talking current to the called line flowing over the two strands of said cord circuit in series, means controlled by the calling party for reversing the direction of the flow of talking current to the called line, means in said cord circuit for maintaining both connected lines in busy condition, and means in said cord circuit responsive to said reversal for rendering said busying means ineffective, said last means including a polarized relay bridged across the talking strands of said cord circuit.

35. In a telephone system, a cord circuit for connecting two lines, means in said cord circuit for maintaining certain potentials on the jacks of the connected lines to make them busy, a relay in said cord circuit through which talking current is supplied to one of the connected lines from a point in the talking connection between the cord circuit and the other connected line, and means responsive to the deenergization of said relay for removing said busy potentials.

36. In a telephone system, a cord circuit for connecting two lines, means in said cord circuit for maintaining certain potentials on the jacks of the connected lines to make them busy, a relay in said cord circuit through which talking current is supplied to one of the connected lines from a point in the talking connection between the cord circuit and the other connected line, and means responsive to the deenergization of said relay for removing said busy potentials and for opening the talking strands of said cord circuit.

37. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and automatic switch in the branch exchange for completing the connection to the called line, and means under the control of either the calling or called party for releasing all said switches.

38. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange for completing the connection to the called line, and means under the control of either the calling or called party for opening the talking circuit at said cord circuit.

39. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange for completing the connection to the called line, and means under the control of either the calling or called party for opening the talking circuit at said cord circuit and for restoring all of said switches to normal.

40. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange for completing the connection to the called line, and means under the control of the calling party for releasing all said switches.

41. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange for completing the connection to the called line, means for supplying talking current to the called line from the main exchange, and means under the control of either the calling or called party for releasing all said switches.

42. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange, for completing the connection to the called line, means for supplying talking current to the called line from the main exchange, and means under the control of the called party for opening the talking circuit at said cord circuit.

43. In a telephone system, a main exchange, a branch exchange, a trunk line connecting said exchanges, means including said trunk line and a series of automatic switches in the main exchange for extending a call from a calling party in the main exchange to the branch exchange, a plug ending cord circuit in the branch exchange, means including said cord circuit and a local trunk line and an automatic switch in the branch exchange for completing the connection to the called line, means for supplying talking current to the called line from the main exchange, and means under the control of the calling party for opening the talking circuit at said cord circuit.

44. In a telephone system, a trunk line, means for connecting a calling line with said trunk line, means including an operator's cord circuit for connecting said trunk line with a called line, and means in said cord circuit operative responsive to the hanging up of the receiver of the calling line for disconnecting the calling and called lines from said cord circuit.

45. In a telephone system, a trunk line, means for connecting a calling line with said trunk line, means including an operator's cord circuit for connecting said trunk line with a called line, and means controlled from said called line independent of said calling line for disconnecting said called line from said cord circuit.

46. In a telephone system, a trunk line, means for connecting a calling line with said trunk line, means including an operator's cord circuit for connecting said trunk line with a called line, and means controlled from said called line for disconnecting said calling and called lines from said cord circuit.

47. In a telephone system, a cord circuit for connecting two lines, means included in said cord circuit for maintaining both connected lines in busy condition, and means including a relay in said cord circuit controlled from one of said lines by current supplied to the talking connection at a point outside said cord circuit for removing the busy condition even though said cord circuit has not been disconnected.

48. In a telephone system, a cord circuit for connecting two lines, means included in said cord circuit for maintaining both connected lines in busy condition, and means included in said cord circuit controlled from either one of said lines for removing the busy condition even though said cord circuit has not been disconnected.

49. In a telephone system, a calling and a called line, a cord circuit, means for extending said calling line to said cord circuit, a jack adapted when connected to said cord circuit to extend the calling line to said called line, means included in said cord circuit for maintaining the called line in busy condition, and means included in said cord circuit and controlled from said called line for removing the busy condition even though said cord circuit remains connected with said jack.

50. In a telephone system, a calling and a called line, a cord circuit, means for extending said calling line to said cord circuit, a jack adapted when connected to said cord circuit to extend the calling line to said called line, means included in said cord circuit for maintaining said calling and called lines in busy condition, and means included in said cord circuit controlled from either said calling line or said called line for removing said busy condition even though said jack remains connected with said cord circuit.

51. In a telephone system, a calling and a called line, a cord circuit, means for extending said calling line to said cord circuit, a jack adapted when connected to said cord circuit to extend the calling line to said called line, means included in said cord circuit for maintaining said calling and called lines in busy condition, and means included in said cord circuit controlled from said called line for removing said busy condition even though said jack remains connected with said cord circuit.

52. In a telephone system, a calling and a called line, a cord circuit, means for extending said calling line to said cord circuit, a jack adapted when connected to said cord circuit to extend the calling line to said called line, means included in said cord circuit for maintaining said calling line in busy condition, and means included in said cord circuit controlled from said called line for removing said busy condition even though said jack remains connected with said cord circuit.

53. In a telephone system, a calling and a called line, a cord circuit, means for extending said calling line to said cord circuit, a jack adapted when connected to said cord circuit to extend the calling line to said called line, means included in said cord circuit for maintaining said called line in busy condition, and means included in said cord circuit controlled from either said calling line or said called line for removing said busy condition, even though said jack remains connected with said cord circuit.

54. In a telephone system, a trunk line and a signal therefor, means for connecting a calling line with said trunk line and for operating said signal, means including an operator's cord circuit for connecting said trunk line with a called line, means in said cord circuit operative responsive to the hanging up of the receiver of the calling line for disconnecting the calling and called lines from said cord circuit, and means operative when said trunk line is again seized for operating said signal even though said cord circuit remains associated with said trunk line.

55. In an automatic telephone system, a called line, a plurality of automatic switches for linking a tandem connection to the terminals of the called line, a back release circuit for applying switch sustaining ground back from the last switch linked into the connection, and means controlled over the called line for removing said ground to thereby cause said plurality of switches to restore from the operated condition in the connection.

56. In an automatic telephone system, a called line, a plurality of automatic switches for linking a tandem connection to the terminals of the called line, means controlled over the calling line for maintaining ground applied back from the last switch linked into the connection to sustain the connection to the said last switch, and means controlled over the called line for removing said ground applied from the said last switch while the connection to said last switch is sustained for breaking down the connection to said last switch responsive to the removal of said ground.

57. In an automatic telephone system, a calling line, a called line, a train of automatic switches directively linked to form a temporary connection from the calling line to the called line, automatic means operated over the calling line for causing the restoration from said train of all of said switches of the connection, automatic means operated over the called line for causing the restoration from said train of all of said switches of the connection, and means whereby said restoration from said train of all of said switches of the connection will be caused by the one said automatic means first operated.

58. In an automatic telephone system, a calling line, a called line, a train of automatic switches directively linked to form a temporary connection from the calling line to the called line, a release trunk conductor, means depending upon maintaining a predetermined potential of said release trunk for maintaining certain of the said switches which are positioned antecedent of the switch of said train positioned remotest from the calling line in the train, and means controlled over the calling line and also independently over the called line for removing said potential by control over the corresponding said line.

59. In an automatic telephone system, a called line, a bar terminal of the called line, a calling line, automatic switch mechanism terminating the calling line for seizing the called line and for applying a specific potential to the bar terminal of the called line to prevent subsequent connection to the called line, automatic means in the switch mechanism operated over the called line for removing the said specific potential from the bar terminal of the called line, and automatic means in the switch mechanism operated over the called line independent of any operation on the calling line for removing the said specific potential from the bar terminal of the called line.

60. In an automatic telephone system, a circuit arrangement for a two-way inter-exchange junction, means for causing the junction to be seized at one end for setting up a call, before the other end has been released from a previous connection in the same or opposite direction.

61. In an automatic telephone system, a circuit arrangement for a two-way inter-exchange junction in which one end of the junction may be made available for setting up calls while the other end is still connected up in a previous connection in the same or opposite direction.

62. In an automatic telephone system, the combination of a calling and called subscriber at different exchanges, means for extending a connection between said subscribers over a two-way inter-exchange junction, the release of the connection normally under control of the calling subscriber, means for causing a forced release to take place if the calling subscriber delays hanging up.

63. In an automatic telephone system, the combination of a calling and a called subscriber, means for extending a connection between said subscribers over a junction, the release of the connection is normally under the control of the calling party, and in which forced release of a connection is initiated at the called end if the called subscriber is unduly held, means whereby if the calling subscriber initiates a new call the calling end of a junction after forced release has been initiated at the called end, the junction may be seized for the new call in the same direction before the incoming end of the junction has been freed.

64. In an automatic telephone system, the combination of a calling and called subscriber, means for extending a connection between said subscribers, means whereby the release of the connection is normally under control of the calling party, and in which forced release by a called subscriber is controlled by time delay means.

In witness whereof, I hereunto subscribe my name this 5th day of August, A. D. 1931.

JOHN E. GARDNER.